Sept. 6, 1932.   E. C. LOETSCHER   1,876,330
METHOD OF MOLDING TABLE TOPS AND THE LIKE
Filed Jan. 29, 1932    2 Sheets-Sheet 1
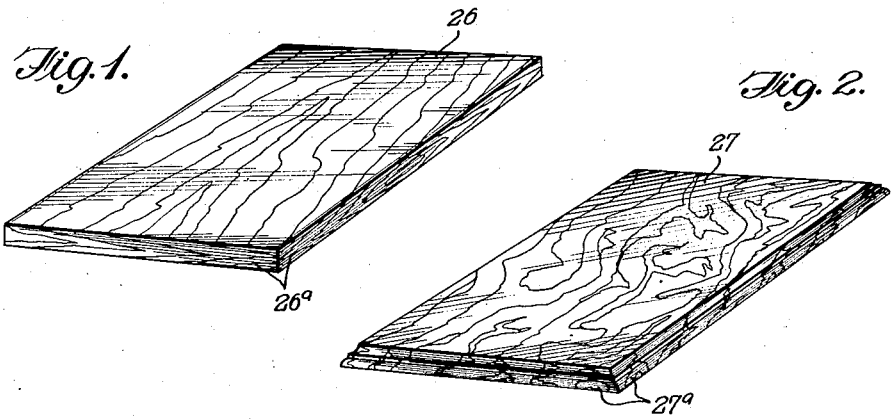
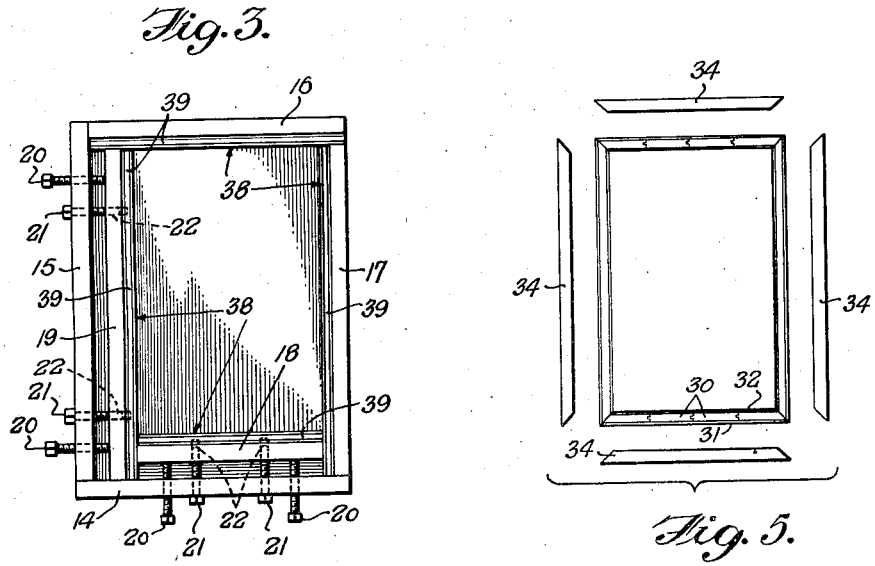
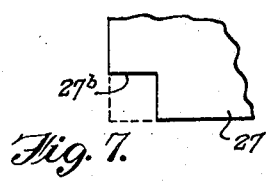
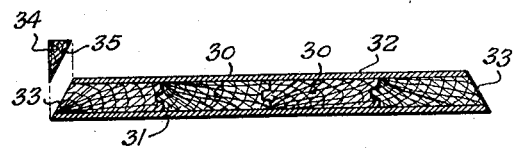
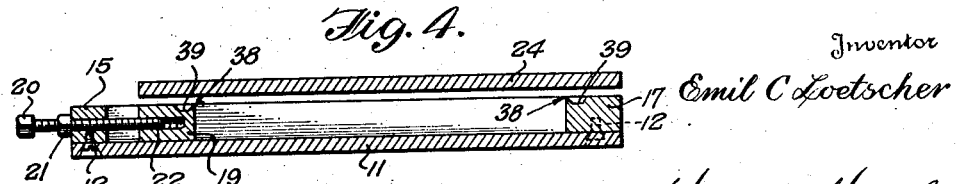
Inventor
Emil C Loetscher
By Havell & Havell.
Attorney Sept. 6, 1932.  E. C. LOETSCHER  1,876,330
METHOD OF MOLDING TABLE TOPS AND THE LIKE
Filed Jan. 29, 1932  2 Sheets-Sheet 2

Inventor
Emil C. Loetscher
By Havell & Havell
Attorneys

Patented Sept. 6, 1932

1,876,330

UNITED STATES PATENT OFFICE

EMIL C. LOETSCHER, OF DUBUQUE, IOWA

METHOD OF MOLDING TABLE TOPS AND THE LIKE

Application filed January 29, 1932. Serial No. 589,756.

The principal object of the invention is to produce a synthetic resin bonded veneered slab and to enable the veneer and associated core covering to be applied simultaneously and without fracture or crumpling thereof to both the face and edges of the slab core by the use of an ordinary unidirectional press such as is commonly used in compressing and reacting laminated synthetic resin bonded products. This object is fulfilled mainly by constructing the core in such a manner that when pressure is applied to its face the core will automatically expand thereby forcing the veneer and associated core covering more or less directly against the sides of the mold.

With the above and other objects in view, reference will be had to the accompanying drawings forming a part of this specification and wherein;—
Figs. 1 and 2 are perspective views of two different forms of the product;

Fig. 3 is a plan view of the mold in which the first product is formed;

Fig. 4 is a transverse vertical section therethrough;

Fig. 5 is a top plan view of the core and related marginal wedge strips;

Fig. 6 is a transverse vertical sectional view through the core and one of the marginal wedge strips;

Fig. 7 is a plan view of a fragment of a veneer or facing sheet;

Figure 8:
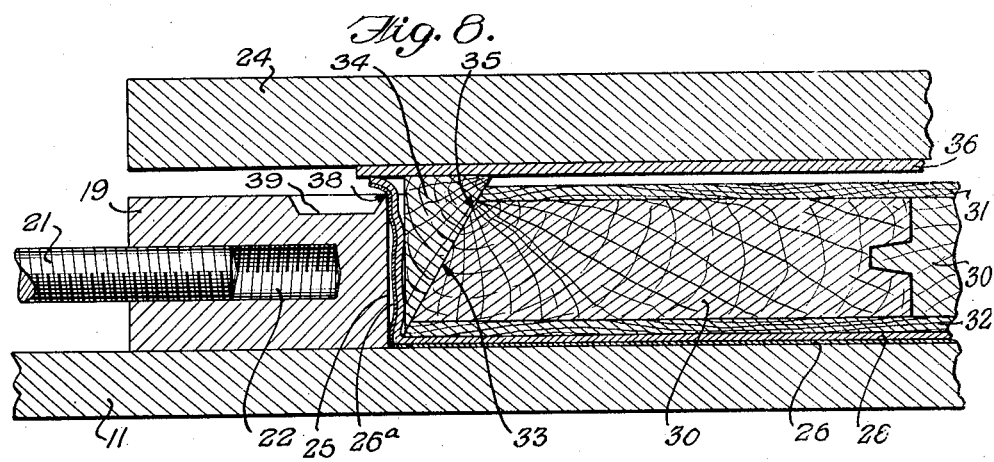
Fig. 8 is a vertical sectional view of a fragment of the mold and the first product showing the method of assembly, the mold being closed but not placed under compression.

In practising the invention, a mold such as is illustrated in Fig. 3 of the drawings is employed. The same consists of a base plate 11 upon the margins of the upper face of which are attached by screws 12, end and side bars 14 and 15 respectively. Similarly, end and side bars 16 and 17 are provided; and these, together with other end and side bars 18 and 19, form the mold cavity. The bars 18 and 19 may be advanced on the base plate 11 by screws 20 and retracted by screws 21. The screws pass through the bars 14 and 15, in which they are threaded and bear against the bars 18 and 19 to close the mold cavity. The screws 21 pass through, and though not threaded in the bars 14 and 15 screw into threaded openings 22 provided in the bars 18 and 19 whereby the latter may be retracted to open the mold cavity to facilitate removal of the molded product. A pressure plate 24 is employed in connection with the mold.

Figure 9:
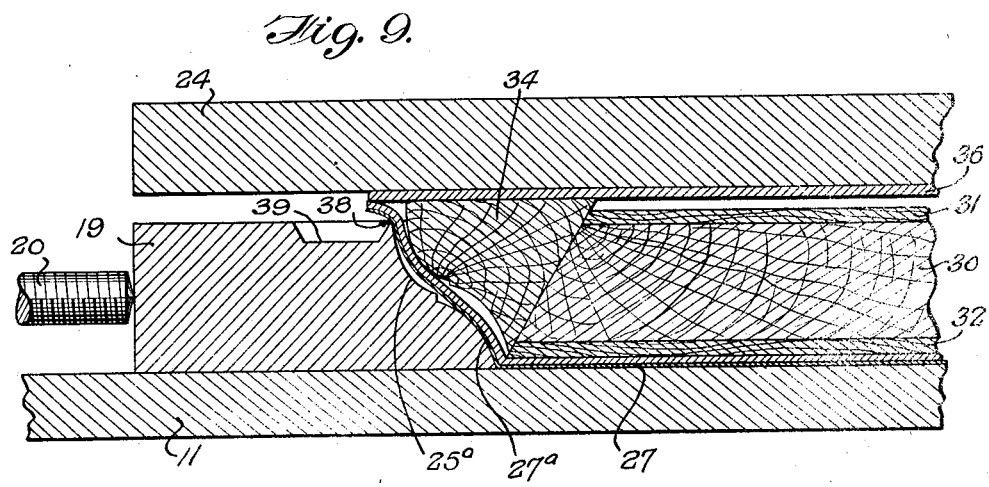
Fig. 9 is a similar view in connection with the second product; and
Figure 10:
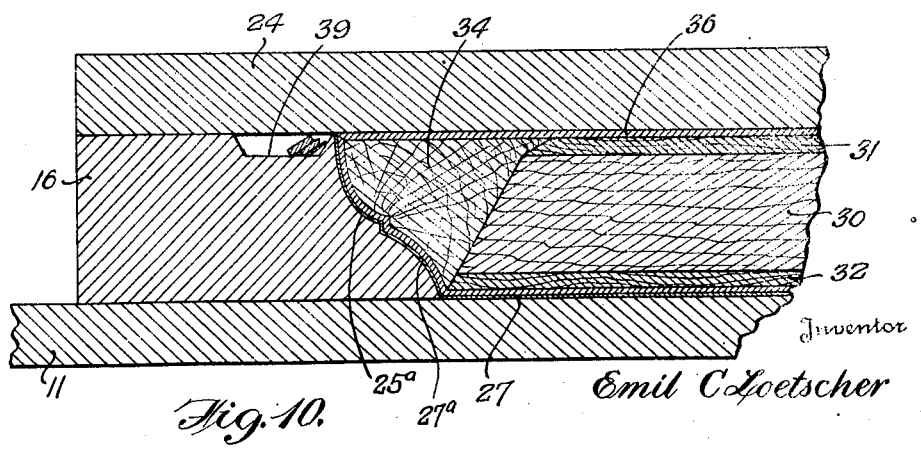
Fig. 10 is a view similar to Fig. 9 with the mold and product under compression.

When a square edge product such as is illustrated in Fig. 1 is to be produced, the bars 16, 17, 18, 19 as illustrated in Figs. 3, 4 and 8 have plain inner edges 25 perpendicular to the base plate, and when a beveled molded edge product such as is illustrated in Fig. 2 is to be produced, the inner edges of said bars are beveled and given a contour 25$^a$, as illustrated in Figs. 9 and 10, corresponding to that of the beveled molded edges to be produced. The bars 18 and 19 need not be retractile when molding bevel edged products and if desired may be fastened to the base plate and the advancing and retracting means eliminated. This is because the bevel edged product may be readily removed from the mold cavity without necessitating retraction of the bars 18 and 19 as is required in removing a square edge product from the mold cavity.

The facing for either product may be wood veneer, plain paper, or paper and the like ornamented to imitate wood or stone graining. When wood veneer is used it may be, and preferably though not essentially is, as thin as 0.01″. This facing sheet 26 may cover only the face of the product, and separate strips 26$^a$ used to cover the edges of the product, as in Fig. 8, or the facing sheet 27 may not only cover the face of the product but may also extend as at 27$^a$ (Figs. 9 and 10) to cover the edges thereof. In the latter case, the sheet 27 in certain cases may require notching at its corners as indicated by numeral 27$^b$ in Fig. 7 to prevent the facing from bunching at the corners.

When natural wood veneer is used, it is customary to have the grain of the edges extend lengthways of such edges, and this can only be obtained by using separate strips to face the edges of the product as illustrated in Fig. 1, but when paper ornamented in imitation of marble is used, the grain of the facing is coextensive with that of the edges, and in that case the facing sheet 27 is extended to also cover the edges 27ª as in Fig. 2. This explains why the facing sheet in one case covers both the face and edges of the product while in another case the facing sheet covers only the face of the product and separate strips are used to cover the edges of the product.

When a square edge product is to be covered with wood veneer, as illustrated in Fig. 8, the facing sheet 26 is cut to the exact size of the face of the finished product and is placed in the bottom of the mold cavity. The edge facing strips 26ª of the same material are then placed around the mold cavity and against the inner faces of the bars 16, 17, 18 and 19. Since wood veneered slabs, such as furniture tops, are usually made with square edges, the facing sheet 26 and edge facing strips 26ª will be assumed to be very thin wood veneer, approximately 0.01″ in thickness. The wood veneer pieces previous to being inserted in the mold cavity are impregnated with a phenolic condensation product of the bakelite type, so that the finished product will have a protective surface film of condensation product.

The sections 26 and 26ª are then backed up with a padding 28 of bakelized or bakelite impregnate paper and this strata may consist of any number of such sheets, satisfactory results having been obtained with from three to ten sheets of this paper. If desired, the sheets making up the strata 28 may extend over both the face and edges of the product or may be sectional like the facing 26, 26ª.

A compressible lumber core made up of jointed pieces 30 and faced on both sides with cross bandings 31 and 32 having their grains crossing that of the pieces 30, is provided with beveled edges 33 preferably cut on an angle of 60°. This is placed into the mold cavity with its face 31, which is of greater area than the face 32, engaging the strata 28. The core, previous to being placed into the mold, is treated with bakelite varnish by coating or immersion.

Wedges 34 consisting of strips of compressible wood mitered at their ends to frame the core proper and having their inner faces 35 beveled on the same angle as the core edges 33 are provided to fill out the parts of the edges of the core that were beveled away. The vertical thickness of these wedges 34 is greater normally than that of the core proper as clearly illustrated in Fig. 8 for a purpose to be later described. These wedges, as in the case of the core, are treated with bakelite varnish. A backing paper 36 impregnated with bakelite is then applied over the entire assembly and pressure plate 24 is then placed thereon.

The bars 16, 17, 18, 19 are all provided with cutting edges 38 which sever any flash or surplus facing, padding, and backing, for the reception of which gutters 39 are provided in said bars so such cuttings will not intervene to prevent the pressure plate 24 from completing its movement relative to the mold proper.

When the filled mold and the associated pressure plate enter the press, which latter is not shown but is of the steam heated and water cooled type commonly employed in the fabrication of condensation products, the same will appear as indicated in Fig. 8 and when pressure is applied by the upper and lower press platens, the wedge strips 34 are forced downwardly, the beveled edges 35 thereof riding the beveled edge 33 and causing the outer faces of the wedge strips 34 to move laterally against the padding 28 forcing the latter and the facing strips 26ª against the inner faces of the mold bars 16, 17, 18 and 19. When the wedge strips 34 find a seat, their upper faces are still above that of the cross banding 31, due to the strips 34 being thicker than the core. As pressure continues, the wedge strips become compressed to the same thickness as the core and their grain becomes considerably compacted. This compression of the wedge strips 34 causes the cross banding 31 and backing sheet 36 to come together and to become adhesively united, after which the core also becomes slightly compressed and the surplus edgings and flash finally cut off by the cutting edges 38, and these cuttings fall into the gutters 39.

During compression by the press, the press platens are heated and the heat is transmitted to the various parts of the product to first fuse the condensation product and later to react the same into an infusible and insoluble state. The press platens are then cooled to set or harden the condensation product so the latter will hold the various parts of the product in the positions and shapes given them by the molding operation. The product is then removed from the mold by retraction of the bars 18 and 19 by turning the screws 20 and 21.

When a beveled molded edge product such as is illustrated in Fig. 2 is to be covered with marbleized paper, a sheet 27 thereof impregnated with synthetic resin as in the case of the wood veneer is placed within the bottom of the mold cavity and the margins 27ª of the sheet are turned upwardly and laid against the beveled molded edges 25ª of the bars 16, 17, 18 and 19 as illustrated in Fig. 9. The preparation of the various parts of the product, arrangement thereof and method pursued, are otherwise the same as described in connection with Fig. 8, the only difference being that the outer faces of the wedge strips 34 are beveled and given the shape of molding substantially corresponding to the contour of the bar faces 25ᵃ. When the mold has been forced to final position and the product will have become compressed to the condition and form illustrated in Fig. 10, after which the pressure plate is lifted and the product lifted or dumped from the mold, retraction of the bars 18 and 19 being unnecessary in this case. Since the grain of marble is coextensive throughout a slab thereof, the same effect is desirable in an imitation article, hence this effect can be best obtained by having a continuous sheet of marbleized paper cover both the face and edges of a slab, and with this in mind the sheet 27 may be assumed to be marbleized paper.

When irregularities are present between product, or mold and product parts, a molding compound of 50% bakelite resin and 50% wood flour, with or without coloring matter may be applied to occur between padding layer 28 and the wedge strips 34, or/and elsewhere to fill out slight inequalities in the wood and to cause the facing layer to be uniformly pressed against the edges of the bars 16, 17, 18 and 19 and mold bottom 11 without areas of low density occurring to cause dull surface spots to develop in the surface finish.

It is necessary in all cases to cut the wedge strips 34 shorter than the edges of the core they are to fill in order to properly enter these strips. This causes a gap at the miters, but the same is filled by the excess of condensation product flowing into and filling such gaps.

When the synthetic resin fuses, the facing and padding layers become more or less plastic, and adjust themselves somewhat to compensate for slight irregularities between parts.

The wedge strips 34, framing the core, act as battens on the core to hold the same straight and prevent warping thereof.

The backing sheet 36 also prevents the product from warping, but may be dispensed with if a sufficiently heavy cross banding 31 is used to counteract the reaction or pull of the surface layers 26, 27, 28.

In making table tops wherein a condensation product is used as the adhesive, it is the usual practice to form a slab, to dress the edges to desired form and then to apply facing strips over the edges thereof, the result being an article with inferior corners that soon open. By the present invention, the parts are all welded together into virtually a monolithic structure in a single pressing operation, presenting corners that cannot open from any cause not destructive of the product as a whole.

It is particularly pointed out that the facing sheets or layers 26 or 27, in the present method, are not subjected to strains such as may result in rupture of such facing sheets or mutilation of the synthetic resin surface coating since the pressure of the wedge strips 34 upon the facing sheets is in a direction at right angles thereto and to the faces of bars 16, 17, 18 and 19.

In both cases when the wedge strips 34 shift outwardly the backing layer 36 being frictionally clamped between the pressure plate 24 and said wedge strips becomes stretched slightly in all horizontal directions and in that state becomes affixed to the face of the core and strips thereby offsetting the pull of the facing 26 or 27 which otherwise may result in warping of the product.

The layers 26—26ᵃ or 27 together with the strata of padding paper 28 make up a compound veneer for the core and should other layers be added outside the wedge strips the same would still be a part of the compound veneer.

Obviously the mold may be reversed in the press or the press may be constructed to reciprocate in a horizontal plane upon a mold set on edge, hence such terms as "side walls," "horizontal" and the like must be considered in their relative sense.

While the synthetic resin is preferably applied to the veneers 26, 26ᵃ, 27 by immersion, the same may be applied by brush or like coating, and in the case of fabricated material may be incorporated in the sheets at the time of their manufacture. When applied by immersion or coating, the surface film of synthetic resin is present both before and after the pressing and heating operation, but when incorporated, the film does not entirely form until after the heating and pressing operation brings the synthetic resin to the surface.

In the claims the expression "veneer" unless otherwise specifically modified is intended to cover wood, paper, textile or any other surfacing material, in single or multiple layers, with which it is desired to cover the core.

What is claimed:—

1. The method of veneering a core, consisting in applying synthetic resin adhesive to certain of the component parts, lining the end and side walls of a mold cavity with veneering, placing within the lined mold cavity a core that will expand against the lined side walls thereof when pressure is applied to one face of said core, applying pressure to press the core against the lined end wall of the mold cavity and to cause the core to expand against the lined sides of the mold cavity, and applying heat to react the synthetic resin to cause it to bind the component parts of the product in their final relation.

2. The method of veneering a core, consisting in applying synthetic resin adhesive to certain of the component parts, lining the end and side walls of a mold cavity with veneering, placing within the lined mold cavity a core provided with marginal parts that will shift toward the lined side walls of the mold cavity when pressure is applied to one face of said core, applying pressure to press the core against the lined end wall of the mold cavity and to cause the marginal parts to shift against the lined side walls of the mold cavity, and applying heat to react the synthetic resin to cause it to bind the component parts of the product in their final relation.

3. The method of veneering a core, consisting in applying synthetic resin binder adhesive to certain of the component parts, lining the end and side walls of a mold cavity with veneering, placing within the lined mold cavity a core provided with parts that will shift toward the lined side walls of the mold cavity when pressure is applied to one face of said core, applying a backing to the core, applying pressure to press the core against the lined end wall of the mold cavity and to cause the core parts to shift against the lined side walls of the mold cavity, and applying heat to react the synthetic resin to cause it to bind the component parts of the product in their final relation.

4. The method of veneering a core, consisting in applying synthetic resin adhesive to certain of the component parts, lining the end and side walls of a mold cavity with veneering, placing within the lined mold cavity a core having beveled edges, inserting wedges between the beveled core edges and the lined side walls of the mold cavity, applying pressure to press the core against the lined end wall of the mold cavity and to force the wedges along the beveled edges of the core to shift the wedges against the lined side walls of the mold cavity, and applying heat to react the synthetic resin to cause it to bind the component parts in their final relation.

5. The method of veneering a core, consisting in applying synthetic resin adhesive to certain of the component parts, lining the end and side walls of a mold cavity with veneering, placing within the lined mold cavity a core having beveled edges, inserting wedges between the beveled core edges and the lined side walls of the mold cavity, the wedges being thicker than the core in the same direction, applying pressure to press the core against the lined end wall of the mold cavity and to force the wedges along the beveled edges of the core to shift the wedges against the lined side walls of the mold cavity and to compact the wedges until their bases are flush with the surface of the core, and applying heat to react the synthetic resin to cause it to bind the component parts in their final relation.

6. The method of veneering a core, consisting in applying synthetic resin adhesive to certain of the component parts, lining the end and side walls of a mold cavity with veneering, placing within the lined mold cavity a core having beveled edges, inserting wedges between the beveled core edges and the lined side walls of the mold cavity, the wedges being thicker than the core in the same direction, placing a backing upon said wedges, applying pressure to press the core against the lined end wall of the mold cavity and to force the wedges along the beveled edges of the core to shift the wedges against the lined side walls of the mold cavity and to compact the wedges until the backing contacts with the core, and applying heat to react the synthetic resin to cause it to bind the component parts in their final relation.

7. The method of veneering a core, consisting in providing a mold cover and a mold having a projecting cutting edge extending in the direction of the mold cover when juxtaposed, lining the mold cavity with veneering and extending the latter across the cutting edge, placing a core within the lined mold cavity, previously applying adhesive to be present between the core and veneering, placing the mold cover upon the core applying pressure to force the mold cover against the cutting edge to sever the veneering where the same extends across said cutting edge.

8. The method of veneering a core, consisting in providing a mold cover and a mold having a projecting cutting edge extending in the direction of the mold cover when juxtaposed, lining the mold cavity with veneering, placing a core within the lined mold cavity, placing a backing upon the core, extending the veneering and backing across the cutting edge, previously applying adhesive so the same will be present between the core and veneer and core and backing, placing the mold cover on the backing, applying pressure to force the mold cover into engagement with the cutting edge to sever the veneering and backing where the same extends across said cutting edge.

9. The method of forming a completely finished article having a synthetic resin coated veneered face and edge by a single pressing operation of a unidirectional press, consisting in treating parts to be united with synthetic resin to cause bonding thereof into a homogeneous structure and to produce a coating of synthetic resin upon the exposed surface of the veneering of the finished product, lining the end and one side of a mold cavity with the treated veneer, placing within the lined mold cavity a core that will expand in a direction substantially parallel to the general plane of one of its faces upon pressure being applied to one of its other faces, applying pressure to one face of the core and forcing the core against the lined end of the mold cavity and causing the core to expand against the lined side of the mold cavity, and applying heat to react the synthetic resin.

In testimony whereof, I affix my signature.

EMIL C. LOETSCHER.